United States Patent
Yao et al.

(10) Patent No.: US 10,686,656 B2
(45) Date of Patent: Jun. 16, 2020

(54) PROVISIONING A WIRELESS DEVICE WITHOUT KEYPAD

(71) Applicant: SIGNIFY HOLDING B.V., Eindhoven (NL)

(72) Inventors: Jun Yao, Eindhoven (NL); Xiaodong Ge, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 108 days.

(21) Appl. No.: 15/759,108

(22) PCT Filed: Sep. 14, 2016

(86) PCT No.: PCT/EP2016/071684
§ 371 (c)(1),
(2) Date: Mar. 9, 2018

(87) PCT Pub. No.: WO2017/046159
PCT Pub. Date: Mar. 23, 2017

(65) Prior Publication Data
US 2018/0287867 A1   Oct. 4, 2018

(30) Foreign Application Priority Data

Sep. 15, 2015   (WO) ................ PCT/CN2015/089612

(51) Int. Cl.
*H04L 12/24* (2006.01)
*H04W 12/04* (2009.01)
(Continued)

(52) U.S. Cl.
CPC ...... *H04L 41/0806* (2013.01); *H04L 25/4906* (2013.01); *H04L 41/28* (2013.01);
(Continued)

(58) Field of Classification Search
None
See application file for complete search history.

(56) References Cited

U.S. PATENT DOCUMENTS 4,503,472 A   3/1985 Lacher
9,300,625 B1 *  3/2016 Potlapally ............... H04L 63/04
(Continued)

FOREIGN PATENT DOCUMENTS

CN   103841523 A    6/2014
JP   2009278542 A * 11/2009
WO   2015031779 A1   3/2015

OTHER PUBLICATIONS

Jie Luo, QUALCOMM: Simple & Secure Wi-Fi Configuration for Internet of Things, Electrical Engineering and Computer Sciences University of California at Berkeley, Dec. 1, 2013, Technical Report No. UCB/EECS-2013-193, http://www.eecs.berkeley.edu/Pubs/TechRpts/2013/EECS-2013-193.html.
(Continued)

*Primary Examiner* — Ayanah S George
(74) *Attorney, Agent, or Firm* — Daniel J. Piotrowski (57) ABSTRACT

The invention relates to a method for transmitting information, particularly network parameters for connecting to a wireless network, from a provisioning device to a wireless device via a wireless interface. The information is obtained in an encoded form in the provisioning device and the provisioning device transmits a sequence of data packets (21) in accordance with a pattern generated based on the encoded information. Each element of the pattern correspond to a predetermined time distance between consecutive data packets (21) or to a predetermined data packet length, and the data packets (21) have a length which is smaller than a maximum length supported by the wireless interface.

15 Claims, 2 Drawing Sheets

(51) Int. Cl.
*H04L 29/08* (2006.01)
*H04W 12/00* (2009.01)
*H04L 25/49* (2006.01)
*H04W 84/12* (2009.01)

(52) U.S. Cl.
CPC ............ *H04L 67/06* (2013.01); *H04L 69/324* (2013.01); *H04W 12/0023* (2019.01); *H04W 12/04* (2013.01); *H04W 84/12* (2013.01)

(56) References Cited

U.S. PATENT DOCUMENTS

| | | | |
|---|---|---|---|
| 2005/0239439 | A1 | 10/2005 | Manabe |
| 2013/0034376 | A1 | 2/2013 | Saiga |
| 2014/0254477 | A1* | 9/2014 | Fricke .................. H04W 12/04 370/328 |
| 2015/0023336 | A1 | 1/2015 | Ilsar et al. |
| 2016/0380871 | A1* | 12/2016 | Gotwals .................. H04L 43/50 370/248 |

OTHER PUBLICATIONS

Gil Reiter, "A primer to Wi-Fi® provisioning for IoT applications", Texas Instruments, Jul. 2014.

Jared Dulmage et al, "A Modulation Dependent Channel Coherence Metric for VANET simulation using IEEE 802.11p", Department of Electrical Engineering, Univ. of California, 2010 IEEE Vehicular Conference, May 16-19, 2010, pp. 1-6.

Pradhumna Lal Shrestha et al, "Towards a Unified Model for the Analysis of Timing-based Covert Channels", IEEE ICC 2014, Communication and Information Systems Security Symposium, pp. 816-820.

Sebastian Zander et al, "A Survey of Covert Channels and Countermeasures in Computer Network Protocols", IEEE Communications Surveys & Tutorials, 3rd Quarter 2007, vol. 9, No. 3.

* cited by examiner

PROVISIONING A WIRELESS DEVICE WITHOUT KEYPAD

CROSS-REFERENCE TO PRIOR APPLICATIONS

This application is the U.S. National Phase application under 35 U.S.C. § 371 of International Application No. PCT/EP2016/071684, filed on Sep. 14, 2016 which claims the benefit of Chinese Patent Application No. PCT/CN2015/089612 filed on Sep. 15, 2015. These applications are hereby incorporated by reference herein.

FIELD OF THE INVENTION

The invention relates to the transmission of information to a wireless device. More specifically, the invention relates to a method for transmitting information from a provisioning device to a wireless device via a wireless interface for connecting to a wireless network. Further, the invention relates to a provisioning device and to a wireless device for carrying out the method. The information transmitted to the wireless device may particularly comprise network parameters.

BACKGROUND OF THE INVENTION

Wireless networks, such as Wi-Fi networks, become more and more accepted as a means for communicating with a wide variety of devices. In this regard, wireless networks are in principle also a suitable means for communicating with devices which do not dispose of a user interface, such as, for example, a keypad, for inputting alphanumeric information. Examples of such devices include lighting devices or other technical devices used in building services, sensors for monitoring a certain area or the operation of machines or for monitoring health parameters of human beings or animals, or actuators which are controlled from a remote location.

In order to enable wireless devices to access a wireless network at an access point and exchange information via the network, the devices usually have to be set up accordingly. This process, which is also referred to as provisioning herein, involves storage of the network parameters in the devices. For protected Wi-Fi networks, these network parameters usually include an SSID (Service Set Identifier) identifying the access point and a password or security key protecting the communication between the access point and the wireless devices. In order to be stored in a wireless device, the network parameters are usually entered into the device using a corresponding user interface provided by the device. However, this is not possible for wireless devices of the aforementioned type, which do not dispose of a suitable user interface.

One option for setting up such devices would be to pre-store the network parameters therein when manufacturing the devices. However, this option greatly reduces the flexibility of the wireless devices since it requires knowledge of the network parameters of the access point, to which the wireless device will connect, already at the time of the manufacturing of the wireless devices and would not allow to connect the wireless devices to access points using other network parameters or to change the network parameters of the access point.

A further option described in US 2014/0254477 A1 involves a wireless transmission of network parameters in the form of data packets having a plurality of lengths. Such data packets are transmitted to load control devices communicating with one another via a wireless communication network, and the load control devices decode the access information from the modulated lengths of the data packets. US 2014/0254477 A1 suggests that in such a way log(N−M) bits of the network parameters can be encoded per data packet, if the data packets have a minimum length M and a maximum length N.

By means of the procedure described in US 2014/0254477 A1, it is possible to transmit the network parameters wirelessly to network client devices before these devices can connect to the wireless communication network. However, the data transmission has a reduced reliability when longer data packets having a length up the maximum length supported by the employed wireless communication protocol are used, because such longer data packets may be corrupted more likely than shorter data packets in noisy transmission conditions.

SUMMARY OF THE INVENTION

Therefore, it is an object of the present invention to particularly allow for a more reliable provisioning of wireless devices not having a user interface for entering alphanumeric information.

In a first aspect of the invention, a provisioning device for communicating information to a wireless device is suggested. The provisioning device comprises: a wireless interface for transmitting data packets; a provisioning unit configured for obtaining the information in an encoded form in the provisioning device, and for the provisioning device transmitting via the wireless interface a sequence of data packets in accordance with a pattern generated based on the encoded information, the pattern consisting of elements representing the encoded information. Each element corresponds to a predetermined time distance between consecutive data packets or to a predetermined data packet length. The data packets have a length which is smaller than a maximum length supported by the wireless interface.

Advantage of this first aspect is that: how often the consecutive data packets are transmitted or how long the packets are used for conveying the information, without requiring the wireless device to parse the exact data contained in the packet. This enables the light-weighted wireless device to retrieve the information. Since the sequence of data packets conveying the information to the wireless device only includes smaller data packets—namely data packets having a length that is smaller than a maximum length supported by the wireless interface—a more reliable transmission of information to the wireless device can be achieved. The maximum length supported by the wireless interface may particularly be the maximum packet length provided by the wireless communication protocol or standard used by the wireless interface. The existing Wi-Fi protocol is kept unchanged.

In a further embodiment of the invention, the provisioning device obtains the information in a binary coding format involving two states. This embodiment provides a digitalization solution.

A related embodiment of the invention provides that the pattern of the sequence of data packets consist of two elements, each element representing one of the states of the binary coding format. Since only two pattern elements are used in this embodiment, it is possible to provide a relative large difference between the pattern elements (i.e. a relative large difference between the time distances and/or the packet lengths) and, at the same time, the pattern elements can be kept relatively short so that a very reliable transmission with a high transmission rate can be achieved. The two elements may correspond either to two time distances between consecutive data packets or to two different data packet lengths.

In one embodiment of the invention, the elements only consist of predetermined time distances between consecutive data packets. In a related embodiment, the data packets have an equal predefined length. These embodiments allow for transmitting very short data packets so that the data transmission rate can be improved. In particular, the length of the data packets may correspond to the shortest length supported by the wireless interface.

Likewise, it is generally possible that the pattern only consists of different data packet lengths. In this case, there may be an equal time distance between the data packets and the time distance may be selected relatively small in order to achieve a high transmission rate.

In a further embodiment of the invention, the pattern includes first elements corresponding to time distances between consecutive data packets and second elements corresponding to predetermined packet lengths. This embodiment allows for improving the efficiency of the information to the wireless device, since both the time distances between the data packets and the data packets themselves convey information to the wireless device.

In one embodiment of the invention, the provisioning device transmits a further sequence of data packets in accordance with a synchronization pattern prior to the sequence of data packets representing the information. In these embodiments, the synchronization pattern may particularly indicate the beginning of the sequence of data packets representing the information so that the wireless can reliably determine the complete information.

In a further embodiment of the invention, the information comprises network parameters to be used by the wireless device to connect to the wireless network. The network parameters may particularly comprise an identification of a wireless access point of the wireless network and/or a security key for authentication with the access point. Upon receipt of the network parameters, the wireless device may use the network parameters to connect to a wireless access point in order to exchange (further) information via the access point.

Furthermore, one embodiment of the invention provides that the provisioning device addresses the sequence of data packets to an access point of a wireless network. This embodiment complies with the present protocol. However, it is not necessary that the data packets are received by an access point or any other recipient. Thus, the provisioning device may likewise address the data packets to another recipient different from the access point, which may even be a fictional recipient.

Moreover, the data packets conveying the information to the wireless device can generally include arbitrary payload data, since such data is not used for conveying the information. In this regard, the data packets comprise random payload in one embodiment of the invention. However, it is likewise possible to use other payload data.

In a further aspect of the invention, a wireless device for connecting to a wireless network is suggested. The wireless device comprises a wireless interface for receiving a sequence of data packets transmitted in accordance with a pattern consisting of elements representing encoded information, each element corresponding to a predetermined time distance between consecutive data packets or to a predetermined data packet length and the data packets having a length which is smaller than a maximum length supported by the wireless interface. Further, the wireless device comprises an analysis module configured to determine the encoded information on the basis of the pattern.

When receiving the sequence of data packets, the wireless device may simultaneously receive further data packets relating to other data transmissions. Therefore, a further related embodiment of the invention provides that the wireless device filters received data packets to discard data packets not having one of the predetermined lengths. If plural packet lengths are used as pattern elements, the wireless device may particularly discard packets having other lengths. In case the pattern elements consist of different time distances and the packets have an equal predefined length, the wireless device may particularly discard all data packets which do not have this predefined length. By means of such a filtering, data packets which do not belong to the sequence of data packets representing the information can be easily and reliably discarded so the particularly the reliability of the information transmission can be further improved.

In a further embodiment, the wireless device recognizes the further sequence of data packets on the basis of the synchronization pattern and determines the encoded information on the basis of the sequence of data packets following the further sequence of data packets.

Corresponding to the above device aspect, embodiments of the invention also provides method aspect. In a third aspect, it is provided a method for transmitting information from a provisioning device to a wireless device via a wireless interface for connecting to a wireless network, the method comprising: obtaining the information in an encoded form in the provisioning device; and transmitting via the wireless interface a sequence of data packets in accordance with a pattern generated based on the encoded information, the pattern consisting of elements representing the encoded information, each element corresponding to a predetermined time distance between consecutive data packets or to a predetermined data packet length, wherein the data packets have a length which is smaller than a maximum length supported by the wireless interface.

In a fourth aspect, it is provided a method for receiving information at to a wireless device from a provisioning device via a wireless interface for connecting to a wireless network, the method comprising: receiving a sequence of data packets transmitted in accordance with a pattern consisting of elements representing encoded information, each element corresponding to a predetermined time distance between consecutive data packets or to a predetermined data packet length and the data packets having a length which is smaller than a maximum length supported by the wireless interface, and determining the encoded information on the basis of the pattern.

It shall be understood that the provisioning device according to claim 1, the wireless device according to claim 11, and the method according to claims 14 and 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
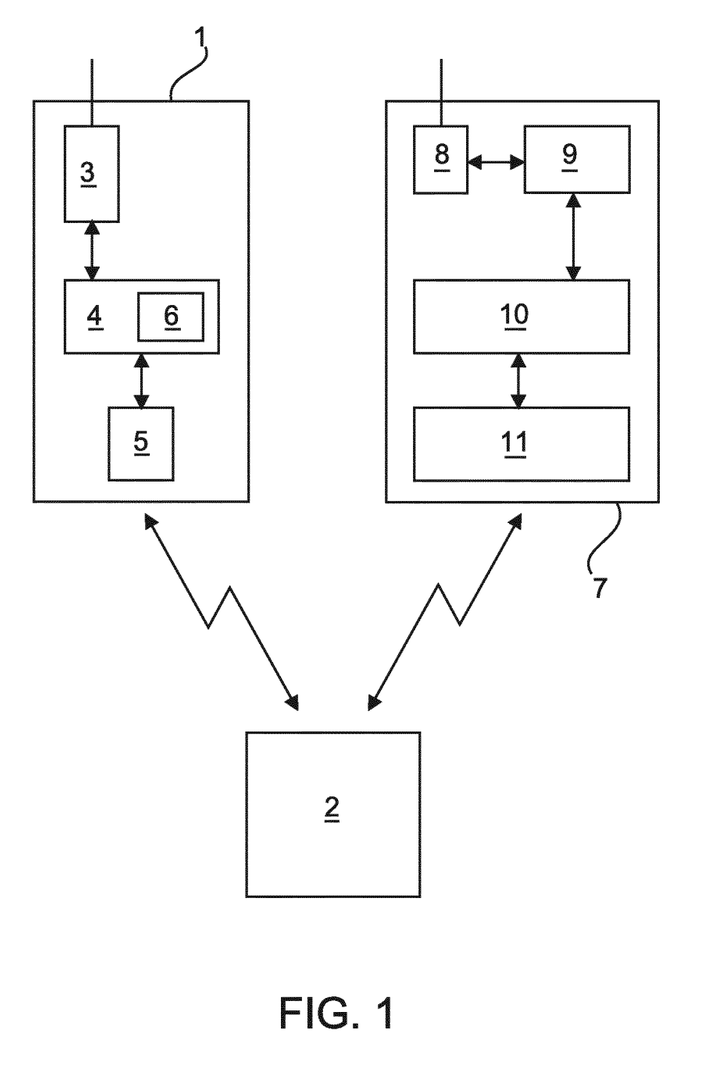
FIG. 1 schematically and exemplarily illustrates a system including a wireless device and a provisioning device for transmitting information to the wireless device, FIG. 2 schematically and exemplarily shows a sequence of data packets representing information in one embodiment, and FIG. 3 schematically and exemplarily shows a sequence of data packets representing the same information a further embodiment.

FIG. 1 schematically and exemplarily shows a wireless device 1 which is enabled to connect to a wireless network in its normal mode of operation. In particular, the wireless device 1 can be connected to a wireless access point 2 and communicate with the access point 2 in accordance with a wireless communication technology. In this respect, the wireless device 1 and the access point 2 may be connectable in a wireless local area network (WLAN) according to an IEEE 802.11 standard or according to another standard for implementing WLAN communication. However, the invention is not limited to WLAN communication and may in principle also be used in other wireless communication technologies, such as wireless metropolitan area networks according to an IEEE 802.15 or 802.16 standard or another suitable standard, or in mobile communications, for example.

When the wireless device 1 is connected to the access point 2 in its normal mode of operation, the access point 2 may route messages received from one or more further device(s) to the wireless device 1 and/or route messages received from the wireless device 1 to one or more further device(s). The further device(s) (not shown in the figures) may be connected to the access point 2 within the same wireless network as the wireless device 1. Likewise, it is possible that the further device(s) are connected to the access point 2 via one or more further wired and/or wireless network(s).

In one embodiment, the wireless device 1 is configured for performing machine-to-machine communication and does not dispose of a user interface allowing a user to enter alphanumeric information. In particular, the wireless device 1 may be a lighting device, such as a luminaire, which receives control commands from one or more control device(s) via the access point 2. For instance, such control commands may activate or deactivate the lighting device, specify a certain intensity or color of light emitted by the lighting device or may specify further configuration information, such as, for example, predefined operating hours. Likewise, the wireless device 1 may be any other device capable of receiving information from and/or sending information to further devices. Examples include other devices controlling technical systems installed in a building, such as heating, ventilation and air-conditioning systems and sensor devices for monitoring certain areas (e.g. motion sensors), for monitoring the operation of machines and for monitoring health parameters of human beings or animals. Of course, these examples are not meant to limit the scope of application of the present invention and further examples and fields of application of wireless devices, particularly of wireless devices not having a user interface for entering alphanumeric information, will be apparent to the person skilled in the art.

In order to connect to the access point 2, the wireless device 1 comprises a wireless interface, which may include a wireless communication module 3 and a communication controller 4. The communication module 3 includes an antenna and further equipment for transmitting and receiving radio signals in accordance with the employed wireless communication technology. In particular, the wireless communication module 3 is capable of transmitting and receiving radio signals in a certain radio frequency band used for communicating with the access point 2. The communication controller 4 is coupled to the communication module 3 and particularly configured to control the communication module 3 to exchange messages with the access point 2 in accordance with the employed wireless communication protocol. The communication controller 4 may be configured as a software unit executed in a main processor of the wireless device 1, which also executes further software units to control the operation of the wireless device 1, or the controller 3 may be implemented in a separate microprocessor of the wireless device 1. The communication controller 3 may also be communicatively coupled to the aforementioned further software units of the wireless device 1 and may be configured to forward payload or user data includes in the messages received from the access point to such software units and/or to receive user data to be forwarded to the access point 2 from such software units.

In order to transmit messages to and receive messages from the access point 2, the communication controller 4 uses network parameters which are specific to the access point 2 and which can be stored in a memory 5 of the wireless device 1 coupled to the controller 4. The network parameters particularly include an identification of the access point 2, which may be configured as an SSID, for example, and which is included in the headers of the data packets transmitted to the access point 2. Further, the network parameters may include a security key for protecting the communication with the access point 2 in accordance with the security mechanism implemented in the access point 2. In one embodiment, the security key may be a pre-shared key and may also be stored in the access point 2. When initiating a communication session between the wireless device 1 and the access point 2, the communication controller 4 may use the security key to authenticate the wireless device 1 with the access point 2, where authentication may be carried out in accordance with a challenge-response protocol, for example. Examples of corresponding security mechanisms which involve such a pre-shared key and which may be used in the wireless network for connecting the wireless device 1 and the access point 2 include WEP (Wired Equivalent Privacy), WPA (Wi-Fi Protected Access) and WPA2.

Initially (i.e. after manufacturing the wireless device 1), no network parameters are stored in the memory 5 of the wireless device 1. Rather, the network parameters are stored in the memory 5 after the time of manufacturing the wireless device 1 in a provisioning procedure described herein below. This particularly allows for operating the wireless device 1 in connection with different access points 2 (i.e. access points having different identifications and using different security keys). The provisioning procedure may particularly be carried out by the operator of the wireless device 1 at the site, where the wireless device is operated (of course, the provisioning procedure may also be controlled by someone else and/or at another site).

In order to carry out the provisioning procedure at the side of the wireless device 1, the wireless device 1 comprises an analysis module 6 which analyzes data packets received at the wireless device 1 in a way to be described below in order to derive the network parameters from the received data packets. The analysis module 6 may be implemented as a software module executed in the communication controller 4 and/or (in case the communication controller is implemented in separate microprocessor) in the main processor of the wireless device 1.

Further, a provisioning device 7 is used in the provisioning procedure which provides the network parameters to the wireless device 1 in the provisioning procedure and which may be operated by a person controlling the procedure. The provisioning device 1 may be configured as a smart phone, tablet computer, notebook computer or personal computer enabled for wireless communication in the wireless network established by the access point 2. This does particularly mean that the provisioning device 7 supports the wireless communication technology employed by the access point 2 and the wireless device 1. Particularly, in case the wireless communication technology corresponds to an IEEE 802.11 standard, the devices of the aforementioned type conventionally support this wireless communication technology so that such conventional devices may be used as provisioning devices 7. However, the provisioning device 7 may likewise be configured in another way, such as, for example, as a dedicated device for carrying out the provisioning procedure.

Generally, the provisioning device 7 comprises a wireless interface, which may be configured similarly to the wireless interface of the wireless device 1. In particular, the wireless interface of the provision device may comprise a communication module 8 including an antenna and additional equipment configured for transmitting and receiving radio signals in accordance with the wireless communication technology employed by the access point 2. For controlling the communication module 8 to transmit and receive data in accordance with the employed wireless communication technology, also the wireless interface of the provisioning device 7 may comprise communication controller 9. The communication controller 9 may be implemented as a software module in a main processor of the provisioning device 7 or may be configured as a suitably programmed separate microcontroller. In one embodiment, further programs executed in the provisioning device 1 can access the communication controller 9 and particularly control the communication controller 9 to transmit specific messages via the communication module 8 by means of a suitable application programming interface (API) as it is usually the case in conventional wireless user equipment of the type mentioned above.

In order to carry out the provisioning procedure, the provisioning device 7 comprises a provisioning unit 10, which receives the network parameters and controls the transmission of the network parameters to the wireless device 1. In one embodiment, the provisioning unit 10 is an application installed and executed on the main processor of the provisioning device. In this case, the provisioning unit 10 preferably accesses the communication controller 9 of the provisioning device 7 via the aforementioned API. However, it is likewise possible that the provision unit 10 is integrated in the communication controller 9 as a corresponding software module or is configured for accessing the communication controller 9 in another way.

Further, the provisioning device 7 comprises or is connected to a user interface 11, which may comprise a display and an input device, such as a keyboard and/or a pointing device. The provisioning unit 10 accesses the user interface in a way known to the person skilled in the art to interact with the operator of the provisioning device 1 in connection with the execution of the provision procedure. In particular, the provision unit 10 may provide a graphical user interface which allows initiating the provisioning procedure, for entering or selecting the network parameters and for providing further information to the user, such as, for example, information about the status of the provisioning procedure.

In order to specify the identification of the access point 2 to be transmitted to the wireless device 1, the operator of the provisioning device 7 may enter the identification via the user interface. If the identification has already been used previously in the provisioning device and/or if the provision device 7 is operated in the coverage area of the access point 2, the user may also select the identification from a list of identifications provided by the provisioning unit 10. For generating the list, the provision unit 10 may store previously used identifications and/or may include into the list the identifications of access points 2, the identifications of which are currently received. If the network parameters include a security key, the operator may likewise enter the security key via the user interface. Or, if the security key is already known to the provisioning device 7, the operator may select the security key from a list. In this regard, it is also possible that security keys of access points 2 are stored in the provisioning device 7 in allocation to the identifications of the respective access points 2. In this case, the provisioning unit 10 may automatically obtain the assigned security key in response to a selection of an identification of an access point 2 from a list provided to the operator.

In order to transmit the network parameters to the wireless device 1, the provisioning unit 10 preferably encodes the network parameters in a binary coding format comprising two states, e.g. 0 and 1 (in case the network parameters are not provided in such a format, which is likewise possible). Such an encoding is known to a person skilled in the art as such and is therefore not described in further detail herein. As a result of the encoding, the network parameters are available as bits, where the bits correspond to the digits of the network parameters. After having encoded the network parameters, the provisioning unit 10 instructs the communication controller 9 of the provisioning device 7 to transmit via the communication module 8 a sequence of data packets in accordance with a pattern generated based on the encoded network parameters. Thus, the binarily encoded network parameters are not transported as a payload of the data packets, but via the generated pattern of the sequence of data packets. This corresponds to a transmission via a so-called covert transmission channel.

In one embodiment, the generated pattern comprises two basic elements, where each element corresponds to one state of the coding format. Thus, there may be one pattern element that corresponds to state or value 0 and a further pattern element corresponding to the state or value 1. As will be described in further detail herein below, the pattern elements may particularly correspond to two different data packet lengths or to two different time distances between the data packets in the sequence of data packets.

In further embodiments, the pattern may comprise more than two elements, where the number of elements preferably corresponds to a power of 2. In these embodiments, each element represents plural bits of the binarily encoded network parameters. More specifically, each element may represent N bits in case $2^N$ pattern elements are used. The elements in these embodiments may consist of pattern elements of the same type. In particular, the elements may consist of more than two time distances between consecutive data packets. Likewise, it is possible that different types of pattern elements are used. So, the pattern elements may include two or more time distances between consecutive data packets and additionally two or more different packet lengths. Hereby, the efficiency of the data transmission can be increased since both the data packets and the time intervals between the data packets convey information. In case pattern elements of different types are used, the number of elements preferably again corresponds to a power of 2 for each type. Assuming that $2^N$ elements of one type and $2^M$ elements of the other type are used, each element of the first type represents a block of N bits of the network parameters and each element of the second type represents a block of M bits so that blocks of N bits and blocks of M bits are transmitted alternately in the sequence of data packets. This does effectively correspond to the use of two multiplexed covert channels—one involving the different time distances between consecutive data packets and the other involving the different packet lengths.

The generated sequence of data packets is transmitted by the communication module 8 of the provision unit 10 in such a way that the wireless device 1 can receive the data packets. For this purpose, the transmission is made while the provisioning device 7 is located in sufficient vicinity of the wireless device 1. The transmission is a unicast transmission to a certain recipient (not the wireless device 1) to which the wireless device 1 can listen in order to determine the network parameters from the sequence of data packets. During the transmission of the sequence of data packets, the provisioning device 7 may particularly be connected (i.e. registered as a connected client) with an access point 2 which may be the access point 2 to which the wireless device 1 shall connect. In case the provision device 7 is connected to an access point 2, the data packets in the sequence of data packets may be addressed to this access point 2. However, it is in principal not necessary that the data packets are addressed to an access point 2, particularly it is not necessary that the data packets are addressed to an access point 2 to which the provisioning device 7 is connected. Therefore, the data packets may also include an arbitrary address (which may even be fictional) or they may include no address at all, if the communication controller 9 and communication 8 of the provisioning device 7 support the transmission of such data packets.

Usually, data packets used in wireless communication include a header section, which may have a fixedly predefined length, and a payload section (and possibly one or more further control data section(s)). The header usually comprises—as the address—the identification of the access point 2 to which the data packets are addressed. The address may be configured as an SSID and may be selected as explained above in the provisioning procedure. The payload field may have a variable length, which may be selected within a certain range specified for the employed wireless communication protocol. This range may be between zero (i.e. the data packet does not include any payload) or a certain value greater than zero and a maximum value, where data packets having the maximum length correspond to the so called maximum transmission units (MTUs). Taking IEEE 802.11 as example, the maximum packet length is particularly 2312 bytes. Due to the variable length of the payload field the transmittable data packets have a variable length.

In case the pattern elements of the sequence of data packets only consists of time intervals between consecutive data packets, all data packets preferably have the same length. This length is preferably small compared with the maximum data packet length. In particular, the length may correspond to the minimum length. In case the transmitted pattern includes two or more elements corresponding to different data packet lengths, the smallest data packet length is preferably small compared with the maximum length and may particularly correspond to the minimum data packet length. Moreover, the other used packet length(s) is/are smaller than the maximum packet length. In one embodiment, the length of all data packets may be smaller than a fraction between ⅓ and ⅔ of the maximum packet length. In particular, the data packets may be smaller than one half of the maximum packet length.

By selecting a small data packet length the transmission time or transmission rate for transmitting the network parameters can be improved compared to an implementation using larger data packet lengths (since smaller data packets can be transmitted in a shorter time than larger data packets). Moreover, smaller data packets are less likely corrupted during transmission.

If a data packet in the sequence of data packets includes payload data (which is at least the case for the longer data packet in case different packet lengths are used), the payload data may be generated arbitrarily by the provisioning unit 10 and forwarded to the communication controller 9. In one embodiment, the provisioning unit 10 randomly (or pseudo-randomly) generates the payload data. However, the provisioning unit 10 may likewise obtain the payload data in another way.

In order to allow the wireless device 1 to correctly determine the network parameters from the sequence of data packets, the beginning of the data packet sequence representing the network parameters is preferably signalized to the wireless device 1. This is preferably done by means of a synchronization pattern, which is transmitted before the transmission of the sequence of data packets. As with the sequence of data packets, this transmission is likewise made by the communication controller 9 and communication module 8 under the control of the provisioning unit 10. The synchronization pattern preferably corresponds to a sequence of pattern elements, which is likely not comprised in any sequence of data packets for communicating network parameters. In particular, the synchronization sequence may consist of a periodic sequence of pattern elements. Examples of suitable synchronization patterns correspond to the value sequences 10101010 or 11110000, where each bit may correspond to one pattern element in the synchronization pattern.

In order to signalize the end of the sequence of data packets representing the network parameters, an end pattern may be transmitted under the control of the provisioning unit after the last pattern element of the sequence representing the network parameters. The end patterns are selected in accordance with similar considerations as the synchronization patterns so that examples of suitable end patterns likewise correspond to the value sequences 10101010 or 11110000, where the end pattern is preferably different from the synchronization pattern.

In case different types of pattern elements (i.e. time distances between consecutive data packets and packet lengths) are used for conveying the information to the wireless device 1, the synchronization and end patterns may include a predetermined sequence of pattern elements of one or both types.

The wireless device 1 receives the data packets sent by the provisioning device 7 by means of its communication module 3, and the analysis module 6 of the wireless device 1 analyses the received data packets in order to determine the network parameters. In one embodiment, this analysis is only made in a special provisioning mode of operation of the wireless device 1. This mode of operation may be automatically activated when no valid network parameters (i.e. network parameters allowing for connecting to an access point 2) are stored in the memory 5. As an alternative, the provisioning mode may be activated by an operator using, for example, a corresponding button or switch of the wireless device 1. The provisioning mode may be deactivated again automatically in response to a successful establishment of a connection to the access point 2 using the received network parameters and/or after expiration of a time interval. Likewise, the provisioning mode may be deactivated manually by the operator of the wireless device 1, for example.

The analysis module 6 is configured to detect pattern elements of the employed embodiment of these elements and to determine the states of the binary coding format to which these elements corresponds. Thus, the analysis module 6 is capable of detecting the different time distances between consecutive data packets or the different data packet lengths of the receive data packets and to translate these distances or packet lengths into bits or blocks of bits of the network parameters. Moreover, the analysis module 6 is capable to detect the synchronization and end patterns transmitted by the provisioning device 1.

In the provisioning mode of operation, the analysis module 6 monitors data packets received by means of the communication module 3 in order to look for a sequence of data packets corresponding to the synchronization pattern. When the analysis module 6 detects the synchronization pattern, it analyzes the subsequently received sequence of data packets and detects the pattern elements included in this sequence. Simultaneously, the analysis module 6 looks for the end pattern. When the end pattern is detected, the analysis module 6 does not further analyze the sequence of received data packets and discards any pattern elements detected as part of the end pattern and received after the end pattern. The pattern elements detected between the synchronization pattern and the end pattern are translated into the corresponding bits or blocks of bits of the encoded network parameters in the analysis module 6 in order to obtain the network parameters in binarily encoded form. Then, the analysis module 6 may decode the network parameters and store the network parameters in the memory 5. Upon storage of the network parameters, the communication controller 4 may use the network parameters in order to establish a wireless connection between wireless device 1 and the access point 2.

While being operated in the provisioning mode, the wireless device 1 may receive further data packets transmitted in the wireless network in addition to the data originating from the provisioning device 7. So, the access point 2 and/or further devices connected to the wireless network may transmit data packets, which are unrelated to the transmission of the network parameters to the wireless device 1. Such data packets are preferably ignored by the analysis module 6 when determining the network parameters by means of a suitable filtering of the received data packets.

One option in this respect is a filtering on the basis of the lengths of the received data packets. If only time distances are used as pattern elements, all data packets sent by the provisioning device 7 preferably have equal length. In this case, all data packets having another length may be discarded. If packet lengths are used as pattern elements, there are several types of data packets and all data packets of one type preferably have the same length. Thus, all data packets sent by the provisioning device 7 have one of certain predetermined lengths and data packets having another length may be discarded in the filtering process.

In addition or as an alternative, the analysis module 6 may read the destination address (e.g. the identification of an access point 2 as explained above) and/or a source address included in the data packets forming the synchronization pattern and may discard all subsequent data packets including another destination and/or source address. Here, the source address corresponds to an identification of the device sending the data packets—i.e. an identification of the provisioning device 7 for the data packets forming the sequence representing the network address—which may also be included in the header section of the data packets.

As already mentioned above, one embodiment provides that the pattern elements correspond to time distances between consecutive data packets. In this embodiment, the provisioning device 7 sends the data packets in two or more different time distances. In case two time distances are used, one time distance corresponds to a first state or value of the binary coding format and the other time distance corresponds to the second state or value of the binary coding format. This is schematically and exemplarily illustrated in FIG. 2, which shows a sequence of data packets 21 representing the value sequence . . . 00101 . . . . Here, it is assumed that the shorter time distance $\Delta T1$ corresponds to the value 0 and that the longer time distance $\Delta T2$ corresponds to the value 1. When more than two time differences are used, each individual time distance may represent a block of bits as described above.

Figure 2:
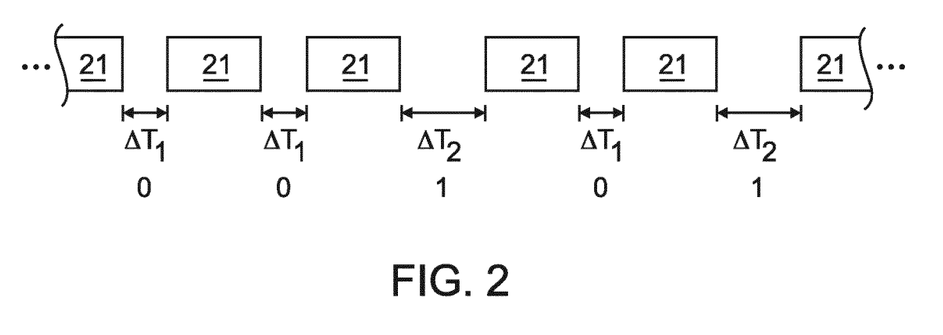

Due to disturbance during the transmission or propagation of the data packets, the time distances between the data packets received in the wireless device 1 may deviate from their predefined values. Therefore, the analysis module 6 does preferably use a predetermined tolerance range when detecting the different time distances in the sequence of data packets received in the wireless device 1. This means that the analysis module 6 also identifies time distances between received data packets as one of the predetermined time distances, when the time distances between the received data packets deviate from the predefined time distance values within the tolerance range. For example, the tolerance for each of the two time distances may be 50% of the respective time distance. Moreover, the time distances are preferably selected such that their difference is sufficiently large so that the analysis module 6 can distinguish between the time distance also in case of possible deviations of the predefine values. Moreover, the shortest time distance is preferably selected relatively short in order to ensure a high transmission rate of the covert channel conveying the network parameters. For example, one time interval may have a duration between 0.5 and 5 ms, particularly 1 ms, and the other time interval (5) may have a larger duration, where the difference between one predefined time interval and the next larger time intervals may be between 8 and 15 ms, particularly 10 ms. Further, if there are more than two time intervals, the time intervals may be equidistant, i.e. when the time distances are sorted according to their duration, the differences between consecutive time distances are equal.

The values of the time distances may be pre-configured in both the provisioning device 7 and the wireless device 1. However, it is likewise, possible that the longer time distance(s) and optionally also the shortest time distance varies/vary for transmissions of different sets of network parameters and that the provisioning unit 10 individually selects the value(s) of the time distance(s). In this case, the selected time distances are particularly used in the synchronization pattern, and the analysis module 6 of the wireless device 1 derives the applicable value(s) of the time distance(s) from the detected synchronization pattern. Especially in case more than two time intervals are used, the synchronization pattern may include base time distances (e.g. the shortest and the second shortest) and the analysis module 6 may determine all time distances from these base time distances. In particular, the analysis module 6 may determine the difference between two base time distances included in the synchronization pattern and may calculate further time distances by adding the difference and possibly multiples thereof to the larger time distance used in the synchronization pattern.

In case of variable time distances, the provisioning unit 10 may select the time distances on the basis of the transmission conditions in the vicinity of the provisioning device, particularly on the basis of the interference level which can be determined in any way known to a person skilled in the art. In case of better transmission conditions (e.g. when the interference level is lower), the provisioning unit 10 preferably selects the time distances such that the differences between the time distances are smaller than in case of worse transmission conditions (e.g. when the interference level is higher). Hereby, the transmission rate can be increased in case of good transmission conditions and the reliability of the data transmission can be improved in worse transmission conditions.

When only time distances are used as pattern elements for conveying the network parameters, the lengths of the data packets of the sequences representing the network parameters and forming the synchronization and end patterns are preferably equal as described above. Moreover, the length of the data packets is preferably selected as short as possible in order to improve the data transmission rate in the covert channel.

In further embodiments mentioned above, the pattern elements correspond to the network parameters different packet lengths. When two packet lengths are used, one packet length corresponds to a first state or value of the binary coding format used for encoding and the other packet length corresponds to the second state or value of the binary coding format. This is schematically and exemplarily illustrated in FIG. 3, which shows a sequence of data packets 21 again representing the value sequence . . . 00101 . . . . Here, it is assumed that the shorter packet length $\Delta L1$ corresponds to the value 0 and that the longer packet length $\Delta L2$ corresponds to the value 1. When more than two packet lengths are used, each packet length corresponds to a block of bits as explained above.

Figure 3:
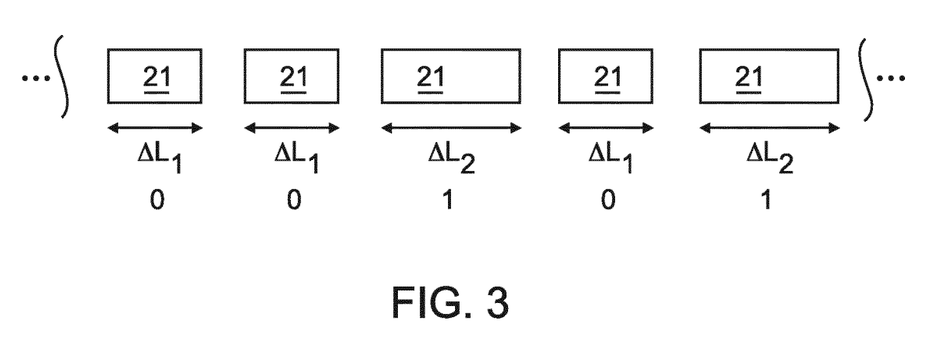

In order to increase the data transmission rate in the covert channel, the shortest packet length may be selected relatively small as already describe above. In particular, the shortest packet length may correspond to the minimum packet length supported by the employed wireless communication protocol. Moreover, unlike the time distance between data packets, the packet length does usually not fluctuate during propagation of the data packets unless the data packets are not completely lost which is more likely for larger data packets. Therefore, the sizes of the larger data packets are preferably selected such that the differences between one packet length and the next larger packet length is relative small. In addition, it is advantageous to select the time distance between the data packets relatively small in case the time distance does not correspond to a pattern element.

The employed packet lengths may be pre-configured in both the provisioning device 7 and the wireless device 1. As an alternative, the longer data packet lengths and optionally also the smallest packet length may vary for transmissions of different sets of network parameters and the provisioning unit 10 may individually select the size(s) of the data packets. Here, the provisioning unit 10 may again select the packet length(s) based on the transmission conditions and particularly on the basis of the interference level in order to take account of different transmission conditions. If two packet lengths are used, the employed sizes of the data packets may particularly be used again in the synchronization pattern, and the analysis module 6 of the wireless device 1 derives the applicable sizes of the data packets from the detected synchronization pattern. If more than two packet lengths are used, the synchronization pattern may include base packet lengths (e.g. the shortest and the second shortest) and the analysis module 6 may determine all packet lengths from these base packet lengths. In particular, the analysis module 6 may determine the difference between two base packet lengths included in the synchronization pattern and may calculate further packet lengths by adding the difference and possibly multiples thereof to the larger packet lengths used in the synchronization pattern.

In both embodiment described above, the sequence of data packets may represent the binarily encoded network parameters in clear text. Already in this case, a potential eavesdropper is prevented from discovering the network parameters, as the eavesdropper does usually not know the employed format of the pattern. In order to further improve security, the provisioning unit 7 may change the allocation between pattern elements and bits or blocks of bits during the transmission. Such a change may be effected based on a predefined criterion. For example, the change may be made upon having transmitted a predetermined number of bits or blocks of bits of the network parameters. In this case, the wireless device 1 uses the new allocation after having received the predetermined number of bits or blocks. As an alternative, the provisioning unit 10 may transmit a predefined control pattern when it changes the allocation, where the control pattern may include predefined sequence of pattern elements In this embodiment, the wireless device 1 uses the new allocation after having received the predetermined control pattern.

Further, the provisioning unit 7 may encrypt the network parameters in such a way that they can be decrypted in the wireless device 1. In this case, the wireless device 1 performs an additional step of decrypting the decoded network parameters before storing and using the network parameters as explained above. Encryption and decryption may be made using any encryption and decryption algorithm known to a person skilled in the art. For instance, encryption and decryption may be made on the basis of a pre-shared symmetric key provided in the provisioning device 7 and in the wireless device 1. Likewise, an asymmetric encryption mechanism may be employed.

In the embodiments describe above, a reliable transmission of network parameters to a wireless device 1 not having a user interface for entering alphanumeric characters is achieved. However, the invention is not limited to the transmission of network parameters. Rather, it is possible to transmit other information, such as control commands, to the wireless device 1 in a similar manner.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A provisioning device for communicating information to a wireless device, the provisioning device comprising:
   a wireless interface for transmitting data packets;
   a provisioning unit configured for obtaining the information in an encoded form in the provisioning device and for controlling the wireless interface to transmit via the wireless interface a sequence of data packets in accordance with a pattern generated based on the information, the pattern comprising elements representing the information, each element corresponding to a predetermined time distance between consecutive data packets,
   wherein each of the data packets in the sequence of data packets has an equal predefined length which is smaller than a maximum length supported by the wireless interface.

2. The provisioning device as defined in claim 1, wherein the provisioning unit is adapted to obtain the information in a binary coding format involving two states.

3. The provisioning device as defined in claim 2, wherein the pattern of the sequence of data packets consist of two elements, each element representing one of the states of the binary coding format.

4. The provisioning device as defined in claim 1, wherein the provisioning device is adapted to transmit a further sequence of data packets in accordance with a synchronization pattern prior to the sequence of data packets representing the information.

5. The provisioning device as defined in claim 1, wherein the information comprises network parameters to be used by the wireless device to connect to the wireless network, the network parameters particularly comprising an identification of a wireless access point of the wireless network and/or a security key for authentication with the access point.

6. The provisioning device as defined in claim 1, wherein the provisioning device is adapted to address the sequence of data packets to an access point of the wireless network.

7. The provisioning device as defined in claim 1, wherein the data packets comprise random payload.

8. A wireless device for connecting to a wireless network, the wireless device comprising:
   a wireless interface for receiving a sequence of data packets transmitted in accordance with a pattern consisting of elements representing information in an encoded form, each element corresponding to a predetermined time distance between consecutive data packets and each of the data packets in the sequence of data packets having an equal predefined length which is smaller than a maximum length supported by the wireless interface, and
   an analysis module configured to determine the information on the basis of the pattern.

9. The wireless device as defined in claim 8, wherein the wireless device is adapted to filter received data packets to discard data packets not having the equal predefined lengths.

10. The wireless device as defined in claim 8, wherein the wireless device is further adapted to recognize a further sequence of data packets on the basis of a synchronization pattern and to determine the information on the basis of the sequence of data packets following the further sequence of data packets.

11. A method for transmitting information from a provisioning device to a wireless device via a wireless interface for connecting to a wireless network, the method comprising:
    obtaining the information in an encoded form in the provisioning device; and
    transmitting via the wireless interface a sequence of data packets in accordance with a pattern generated based on information, the pattern consisting of elements representing the information, each element corresponding to a predetermined time distance between consecutive data packets,
    wherein each of the data packets in the sequence of data packets has an equal predefined length which is smaller than a maximum length supported by the wireless interface.

12. A method for receiving information at to a wireless device from a provisioning device via a wireless interface for connecting to a wireless network, the method comprising:
    receiving a sequence of data packets transmitted in accordance with a pattern consisting of elements representing information in an encoded form, each element corresponding to a predetermined time distance between consecutive data packets and each of the data packets in the sequence of data packets having an equal length which is smaller than a maximum length supported by the wireless interface, and
    determining the encoded information on the basis of the pattern.

13. The method as defined in claim 12, further comprising the following step before the step of determining:
    filtering received data packets to discard data packets not having the equal predefined lengths.

14. A computer program product for transmitting information from a provisioning device to a wireless device via a wireless interface for connecting to a wireless network, the computer program product comprising code fixed in a tangible medium and being configured so as when executed on a processor to:
    obtain the information in an encoded form in the provisioning device; and
    transmit via the wireless interface a sequence of data packets in accordance with a pattern generated based on the information, the pattern consisting of elements representing the information, each element corresponding to a predetermined time distance between consecutive data packets,
    wherein each of the data packets in the sequence of data packets has an equal predefined length which is smaller than a maximum length supported by the wireless interface.

15. A computer program product for receiving information at to a wireless device from a provisioning device via a wireless interface for connecting to a wireless network, the computer program product comprising codes fixed in a tangible medium and being configured so as when executed on a processor to:

receive a sequence of data packets transmitted in accordance with a pattern consisting of elements representing information in an encoded form, each element corresponding to a predetermined time distance between consecutive data packets and each of the data packets in the sequence of data packets having an equal length which is smaller than a maximum length supported by the wireless interface, and determine the information on the basis of the pattern.

* * * * *